(12) United States Patent
Pettinaroli et al.

(10) Patent No.: US 9,383,033 B2
(45) Date of Patent: Jul. 5, 2016

(54) AUTOMATIC BALANCING BALL VALVE

(71) Applicant: FRATELLI PETTINAROLI S.P.A., San Maurizio d'Opaglio (NO) (IT)

(72) Inventors: Giulio Pettinaroli, San Maurizio d'Opaglio (IT); Liborio Spagnolo, San Maurizio d'Opaglio (IT)

(73) Assignee: FRATELLI PETTINAROLI S.P.A., San Maurizio d'Opaglio (IT)

( * ) Notice: Subject to any disclaimer, the term of this patent is extended or adjusted under 35 U.S.C. 154(b) by 0 days.

(21) Appl. No.: 14/386,944

(22) PCT Filed: Mar. 14, 2013

(86) PCT No.: PCT/EP2013/000773
§ 371 (c)(1),
(2) Date: Sep. 22, 2014

(87) PCT Pub. No.: WO2013/139453
PCT Pub. Date: Sep. 26, 2013

(65) Prior Publication Data
US 2015/0053879 A1    Feb. 26, 2015

(30) Foreign Application Priority Data

Mar. 22, 2012  (IT) ............................ MI201200118 U

(51) Int. Cl.
| F16K 39/06 | (2006.01) |
| F24D 19/10 | (2006.01) |
| G05D 7/01  | (2006.01) |
| F16K 5/06  | (2006.01) |
| F16K 5/12  | (2006.01) |

(52) U.S. Cl.
CPC .............. *F16K 39/06* (2013.01); *F16K 5/061* (2013.01); *F16K 5/0605* (2013.01); *F16K 5/0689* (2013.01); *F16K 5/12* (2013.01); *F24D 19/1036* (2013.01); *G05D 7/0106* (2013.01); *F24D 2220/0264* (2013.01)

(58) Field of Classification Search
CPC ....... F16K 39/06; F16K 5/0689; F16K 5/061; F16K 5/12; F16K 5/0605; G05D 7/0106; F24D 19/1036

USPC .......................................................... 137/613
See application file for complete search history.

(56) References Cited

U.S. PATENT DOCUMENTS 6,827,100 B1 * 12/2004 Carlson ................ G05D 7/0106
                                                           137/454.6
7,798,170 B2 *  9/2010 Hotz et al. ............ F16K 5/0647
                                                            137/556.3

FOREIGN PATENT DOCUMENTS

| DE | 198 24 630     | 12/1998 |
| JP | 58-142080      | 8/1983  |
| WO | WO 2004/107075 | 12/2004 |
| WO | WO 2009/006893 | 1/2009  |
| WO | WO 2011/135119 | 11/2011 |

OTHER PUBLICATIONS pp. 1 and 2 of the International Preliminary Report on Patentability in PCT/EP2013/000773 dated Oct. 2, 2014.
International Search Report for PCT/EP2013/000773 mailed Sep. 24, 2013.
Written Opinion of the International Searching Authority for PCT/EP2013/000773 mailed Sep. 24, 2013.

* cited by examiner

*Primary Examiner* — Kevin Lee
(74) *Attorney, Agent, or Firm* — Nixon & Vanderhye P.C.

(57) ABSTRACT

An automatic balancing valve is described provided with a valve body having at least one inlet channel and an outlet channel for a heat transfer fluid, wherein the flow regulation is carried out by a ball shutter having an axial through channel with axis perpendicular to the rotation axis of the ball. The ball valve has at least one radial channel aligned with the rotation axis of the ball and is connected to the axial through channel. The radial channel has an outlet port having a circular cross-section which hydraulically connects the axial through channel of the ball with the outlet channel of the valve.

10 Claims, 4 Drawing Sheets

AUTOMATIC BALANCING BALL VALVE

This application is the U.S. national phase of International Application No. PCT/EP2013/000773 filed 14 Mar. 2013 which designated the U.S. and claims priority to IT MI2012U000118 filed 22 Mar. 2012, the entire contents of each of which are hereby incorporated by reference.

TECHNICAL FIELD OF THE INVENTION

The present invention relates to an automatic balancing valve, for example a valve that can be installed in heating and/or cooling systems consisting of several distinct sections, in order to correctly adjust the feeding of the heat transfer fluid flow in each of the system sections.

PRIOR ART

In general, in hydraulic systems consisting of multiple sections, the fluid flow rates in each section are established at the design stage but can also vary during operation.

For example, referring in particular to heating and/or cooling systems in environments such as schools, hospitals, hotels, shopping centers or the like, the variation in the different flow rate with respect to the design data would inevitably cause differences in temperatures in the different environments that, in addition to the creation of unhealthy situations, result in an increase in energy consumption.

Already known in the art are automatic balancing valves generally comprising a valve body wherein a differential pressure regulator and a flow rate regulator with ball shutter are integrated. The differential pressure regulator and the flow rate regulator are placed in sequence and axially aligned between an inlet channel and an outlet channel.

Such an arrangement, however, involves considerable overall dimensions in the longitudinal direction, especially in the case wherein the valve has large dimensions in order to be installed in large scale systems, such as heating and/or cooling systems of airports, shopping centers or the like.

Alternatively, also valves with shutters axially movable in a vertical direction in place of the ball shutters have been proposed in the prior art. This results in an increase of overall dimensions in the direction perpendicular to inlet and outlet channels; taking into account that the shutter is often driven by a motor arranged above the valve body, the dimensions in height increase considerably. Moreover, the actuation of a shutter that moves axially, with respect to that of simple rotation of a ball, is often more burdensome for the motor, especially taking into account the friction that is generated in the transmission components for transforming the motor rotary motion into the shutter translational motion.

In those circumstances, an object of the present invention is to propose an automatic balancing valve having reduced dimensions.

Another object of the present invention is to propose a valve of the type described above which is structurally simple and easily operable.

SUMMARY OF THE INVENTION

These objects are achieved by the present invention thanks to an automatic balancing valve according to claim 1. Further characteristics and advantages of the present invention are set forth in the respective dependent claims.

An automatic balancing valve according to the invention comprises a valve body having at least one inlet channel and one outlet channel among which a differential pressure regulator and a flow rate regulator are provided. This latter has a ball shutter having an axial through channel with the axis perpendicular to the rotation axis of the ball.

The ball valve is advantageously provided with at least one radial channel aligned with the rotation axis of the ball and connected to the axial through channel. The radial channel has an outlet port having circular cross-section for hydraulic connecting the axial through channel of the ball with the outlet channel of the valve. This allows to place the pressure regulator immediately beneath the flow regulator, in particular just below the ball, thus making the device particularly compact in the axial development. The use of a ball shutter then allows to also limit the overall dimensions in the vertical direction, thereby obtaining a valve of small dimensions.

According to a possible embodiment, the axial through channel of the ball has a circular cross-section port at one end thereof, while the other end is provided with an equal percentage increase section shaped port. A ball valve wherein a port of this type is provided is described for example in European patent application n. EP1439339 in the name of the Applicant.

The ball is advantageously rotatable by an arc of 180° between a first position, wherein the equal percentage increase section shaped port faces the inlet channel, and a second position wherein the circular cross section port is positioned facing the inlet channel. This gives the valve different functions depending on the position in which it is rotated, in particular the main function of adjusting the flow rate, the function of shut-off valve to completely stop the heat transfer fluid flow, as well as the auxiliary function of free flow when it is needed to completely "open" the valve to allow the fluid flow at maximum flow rate, for example when filling the system or during any cleaning treatments of the conduits of the system itself.

Practically, the ball can be rotated from the first position by an arc less than 90° during normal operation, i.e. during the automatic flow rate control effected for example by way of a motor; the flow of fluid through the valve is interrupted when the ball is rotated by an arc equal to 90°, thus acting as a stop valve; by completely turning the ball, the inlet fluid directly meets the circular cross section port of the axial through channel and exits the circular cross section port of the radial channel, therefore without generating an obstacle to the flow.

The differential pressure regulator is of the membrane type, wherein a bellows membrane separates the inner volume of the regulator into a first chamber hydraulically connected to the inlet channel and a second chamber hydraulically connected to the radial channel of the ball.

In this type of regulator a movable shutter is present, mechanically connected to the membrane by way of a rod, which is axially moved between at least one open position, wherein the shutter is positioned spaced from a respective sealing seat, and a closed position, wherein the shutter abuts against the sealing seat. During automatic control, the shutter partially obstructs the fluid flow, i.e. without ever abutting against the sealing seat; the position of complete stop of the flow, wherein the shutter actually abuts against the respective seat, can be obtained only by manually acting, for example by screwing a pin protruding outside the valve body.

The differential pressure regulator shutter has a portion which is slidingly housed in a guide bushing, integral with the pressure regulator casing. To ensure the hydraulic seal, sealing means are provided between the inner wall of the guide bushing and the outer wall of the shutter sliding portion.

The sealing means advantageously comprise at least one polymeric material ring placed in contact with the outer wall of the sliding portion in the guide bushing, and at least one elastic ring of the O-ring type overlapping the polymeric material ring. The hydraulic sealing means thus prepared are housed in a groove of the guide bushing and allow to limit the friction due to any debris and deposits, for example, ferric oxide deposits normally present in the systems, which may compromise the correct sliding of the shutter.

The differential pressure regulator has a casing mounted on the valve body in a position below the ball, with the sealing seat of the shutter axially aligned with the ball rotation axis.

The first chamber of the pressure regulator is preferably hydraulically connected to the inlet channel by way of a conduit external to the valve body. This allows to simplify the valve construction processes according to the invention, while also limiting the overall dimensions of the valve body with respect to some known solutions wherein the connection is made by way of channels formed in the same valve body.

The hydraulic connection of the pressure regulator second chamber with the radial channel of the ball is instead obtained by way of an axial conduit formed in the shutter rod and different radial conduits hydraulically connected to the axial conduit, which are arranged along the rod respectively in correspondence to the ball radial channel and to the second chamber.

BRIEF DESCRIPTION OF THE DRAWINGS

Further characteristics and advantages of the present invention will become more apparent from the following description, given by way of illustration and not of limitation with reference to the accompanying drawings, wherein.

DETAILED DESCRIPTION OF THE INVENTION

Figure 1:
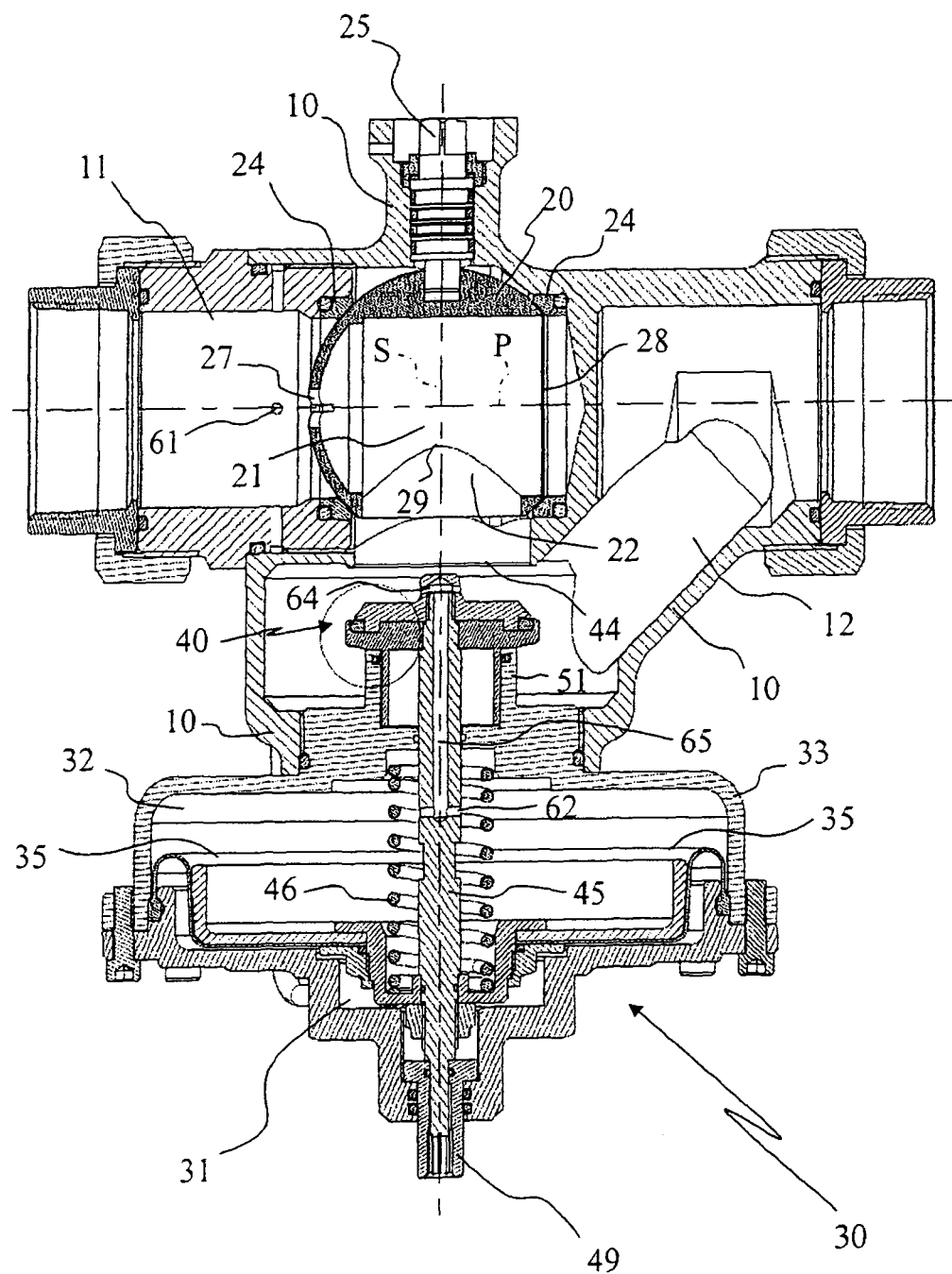
FIG. 1 is a longitudinal sectional view of an automatic balancing valve according to the invention.
Figure 2:
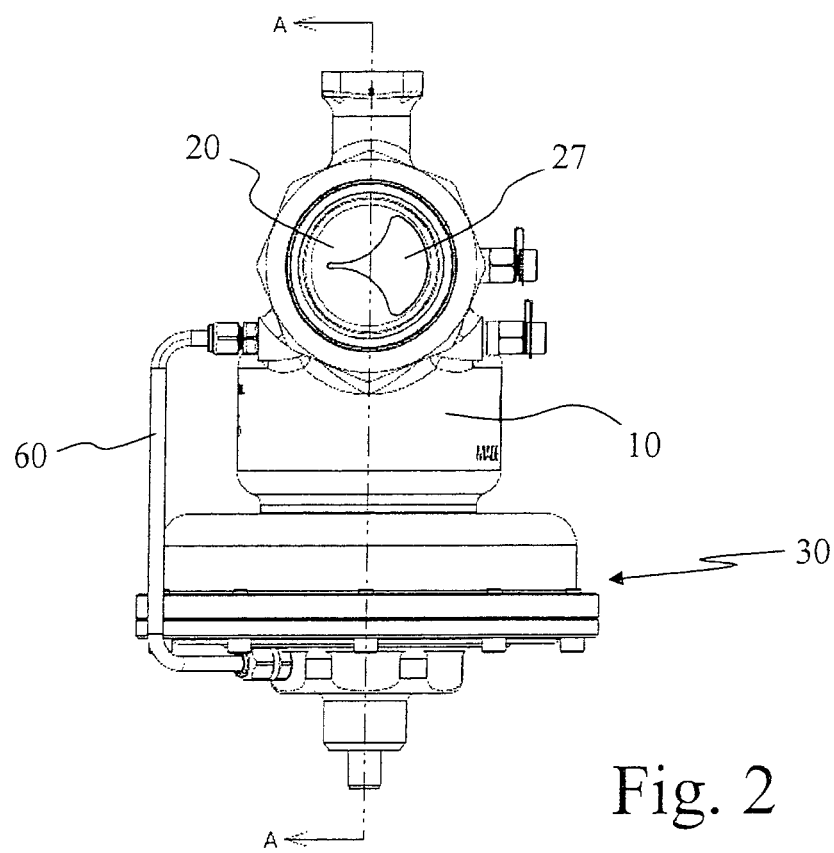
FIG. 2 is a view of the valve of FIG. 1 taken from the inlet side of the fluid.

FIG. 1, which represents a sectional view along the plane A-A of FIG. 2, illustrates an automatic balancing valve according to the invention, comprising in particular a valve body 10 having at least one inlet channel 11 and an outlet channel 12.

Inside it at least one ball valve 20 is housed having an axial through channel 21 with axis P perpendicular to the rotation axis S of the ball 20.

The axial through channel 21 of the ball 20 has an equal percentage increase section shaped port 27 at one end thereof, while the opposite end has a port 28 having circular cross-section. The shape of the port 27 is more clearly visible in the front view of FIG. 2.

The ball valve 20 also has a radial channel 22 aligned with the rotation axis S of the ball and connected to the axial through channel 21. The radial channel 22 has an outlet port 29 having a circular section which hydraulically connects the axial through channel of the ball with the outlet channel of the valve.

The ball 20 is installed between two seats, or seals, 24 of polymeric material, for example PTFE or the like, that ensure the hydraulic seal between the inlet and outlet channels 11 and 12, and is moved by way of a pin 25 which protrudes upwardly from the valve body 10. The rotation of the pin 25, and therefore of the ball 20, can be manually performed, for example by way of a suitable lever, handwheel or knob, or by a motor (not shown).

In a position below the ball 20 a differential pressure regulator 30 is present having a casing 33 mounted on the valve body 10. The differential pressure regulator 30 comprises a membrane bellows 35 which separates the inner volume regulator in a first chamber 31 hydraulically connected to the inlet channel 11 and a second chamber 32 hydraulically connected to the radial channel 22 of the ball 20.

A rod 45 connects the membrane 35 to a movable shutter 40, whose sealing seat 44 is axially aligned with the rotation axis S of the ball 20. As a function of the pressure difference between the chambers 31 and 32, the shutter 40 is automatically moved in an axial direction between an open position, wherein the shutter 40 is spaced from the sealing seat 44, as represented in FIG. 1, and a closed position wherein the shutter 40 approaches the sealing seat 44, but without automatically abutting against the same, i.e. always leaving a passage section for the fluid, though more limited.

The differential pressure adjustment which must be maintained between the chambers 31 and 32 is actuated by adjusting the preload of a spring 46 which acts on the membrane 35 by a pin 49 which protrudes downwards from the casing 33 of the pressure regulator 30. In addition to the preload adjustment, that can be performed for example with a suitable tool, the screwing of the pin 49 also allows to bring the shutter 40 into abutment against the respective seat 44, thereby providing a further opportunity to stop the flow through the valve.

This is very useful in cases where it is necessary to stop the flow through the valve without having to act on the ball shutter 20; this latter is generally driven in rotation by a motor, therefore the closure of the valve by way of the ball shutter would entail removal of the motor and the manual rotation of the ball, while in the valve according to the invention it is possible to choose how to obtain the flow stop even without removing the motor.

Figure 1A:
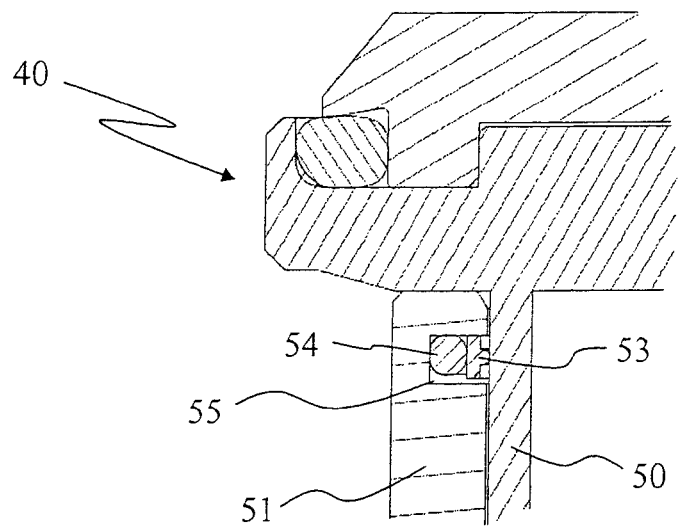
FIG. 1A is an enlarged view of a detail of FIG. 1.

In FIG. 1A is shown an enlarged detail highlighted in the circle of FIG. 1 to more clearly illustrate that the shutter 40 comprises a portion 50 which is slidingly housed in a guide bushing 51 integral with the pressure regulator casing. Between the two mutually sliding surfaces hydraulic sealing means are interposed which comprise a ring of polymeric material 53 placed in contact with the outer wall of the sliding portion 50 and an elastic ring 54, for example of the O-ring type, overlapping the ring 53 of polymeric material. The hydraulic sealing means 53 and 54 are housed in a groove 55 of the guide bushing 51.

The hydraulic connection between the inlet channel 11 of the valve and the first chamber 31 of the differential pressure regulator is obtained by way of a conduit 60 positioned external to the valve body. In FIG. 1 is also visible the port 61 for the hydraulic connection between the inlet channel 11 and the outer conduit 60.

The hydraulic connection between the radial channel 22 of the ball 20 and the second chamber 32 of the pressure regulator 30 is instead obtained by way of an axial conduit 65 formed in the shutter rod 45 and radial conduits 62, 64 hydraulically connected to the axial conduit 65 respectively to the radial channel 22 of the ball 20 (radial conduits 64 above the shutter 40), and to the second chamber 32 (radial conduits 62).

Figure 3:
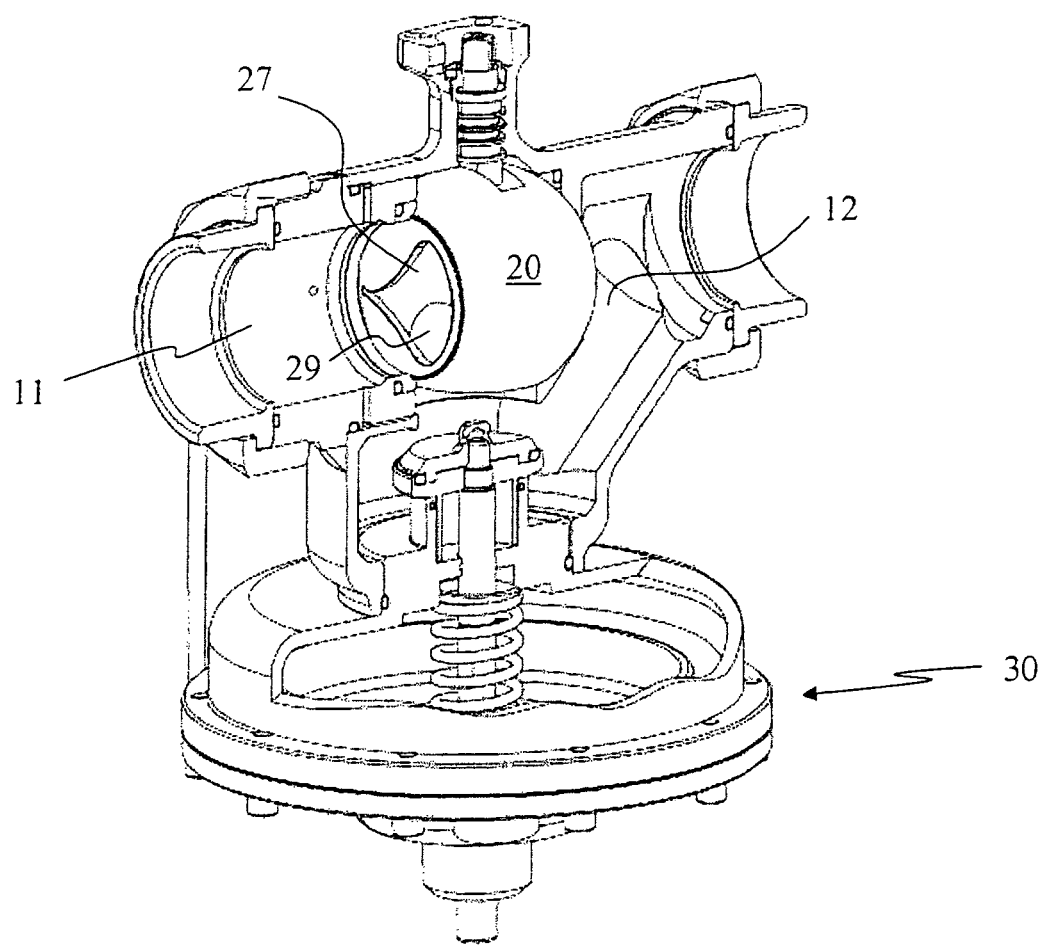
FIG. 3 is a sectional perspective view of the valve with the ball shutter in the position shown in FIG. 2.
Figure 4:
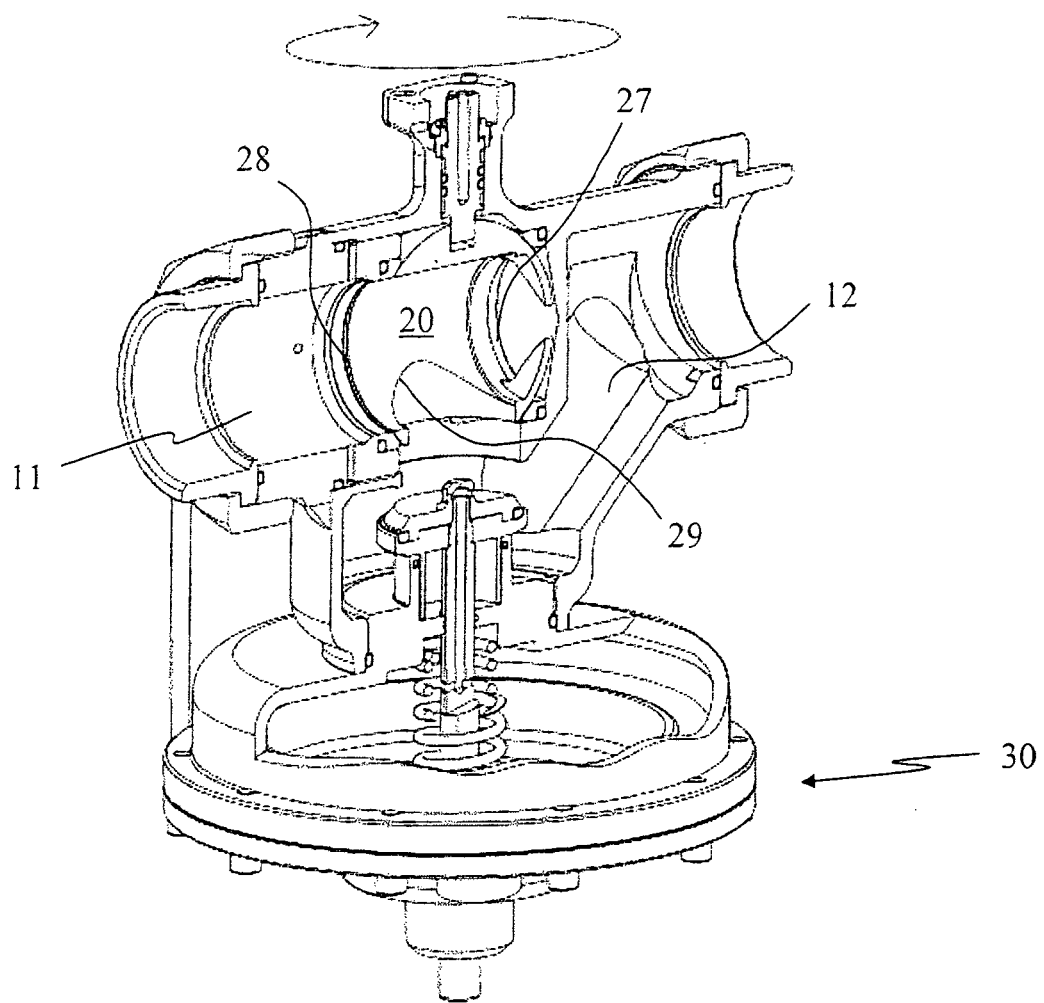
FIG. 4 is a sectional perspective view of the valve with the ball shutter rotated by 180 degrees with respect to the position shown in FIG. 3.

In FIGS. 3 and 4 a valve according to the invention is represented, with the ball 20 in the respective extreme operation positions.

In FIG. 3, the ball 20 is positioned in the initial position, wherein the heat transfer fluid that enters from the inlet channel 11 meets the equal percentage increase section shaped port 27, passes through the axial through channel 21, then through the radial channel 22, and exits from the outlet port 29 of the radial channel 22. As the ball 20 is rotated, the passage section of the heat transfer fluid through the port 27 is gradually reduced, until it is completely canceled when the ball 20 is rotated by 90°.

In FIG. 4 the same valve of FIG. 3 is shown, but with the ball 20 that has completed the rotation by 180°. In this condition, the heat transfer fluid that enters the inlet channel 11 meets the circular cross-section port 28, passes through the axial through channel 21, then through the radial channel 22, and exits the outlet port 29 of the radial channel 22 without encountering reduced sections, and therefore without a significant flow rate reduction. In this position, no flow reduction is carried out, condition which is useful especially during filling and/or maintenance operations of the system conduits.

Various modifications may be made to the embodiments represented herein without going beyond the scope of the present invention. For example, the rotation direction of the ball can be actuated in a clockwise or counterclockwise direction according to the arrangement of the equal percentage increase section shaped port 27. Also the materials can be different from those expressly cited herein for some of the components of the valve according to the invention, provided they have the same characteristics suitable to the respective applications.

The invention claimed is:

1. An automatic balancing valve comprising a valve body having at least one inlet channel and one outlet channel, at least one ball valve having an axial through channel with an axis perpendicular to a rotation axis of a ball of the ball valve and at least one differential pressure regulator, characterized in that said ball valve has at least one radial channel aligned with the rotation axis of the ball and connected to said axial through channel, and in that said radial channel has an outlet port having a circular cross-section which hydraulically connects the axial through channel of the ball with the outlet channel of the valve,
wherein said differential pressure regulator comprises a bellows membrane which separates an inner volume of the regulator into a first chamber hydraulically connected to said inlet channel and a second chamber hydraulically connected to the radial channel of the ball, and wherein a movable shutter is mechanically connected to said membrane by way of a rod.

2. The valve according to claim 1, wherein the axial through channel of said ball of the ball valve has a circular cross section port at one end thereof and an equal percentage increase section shaped port at an opposite end.

3. The valve according to claim 1, wherein said ball of the ball valve is rotatable by an arc of 180° between a first position, wherein an equal percentage increase section shaped port faces said inlet channel, and a second position wherein a circular section port of the axial through channel of said ball of the ball valve is positioned facing said inlet channel.

4. The valve according to claim 1, wherein said shutter is axially movable between at least one open position, wherein the shutter is positioned spaced from a respective sealing seat, and a closed position wherein the shutter abuts against said sealing seat.

5. The valve according to claim 4, wherein said differential pressure regulator has a casing mounted on said valve body in a position beneath said ball, and wherein the sealing seat for said shutter is axially aligned with the rotation axis of said ball.

6. The valve according to claim 1, wherein at least one spring acting on said membrane and means for adjusting a preload of said spring are provided to set a desired value of a differential pressure between the inlet channel and the outlet radial channel of a ball shutter.

7. The valve according to claim 1, wherein said shutter has a portion which is slidingly housed in a guide bushing integral with a pressure regulator casing, and wherein hydraulic sealing means are provided between an inner wall of said guide bushing and an outer wall of the slidable portion of said shutter.

8. The valve according to claim 7, wherein said sealing means comprise at least one ring of polymer material placed in contact with the outer wall of said sliding portion and at least one elastic O-ring overlapping said ring made of polymeric material, said hydraulic sealing means being housed in a groove of said guide bushing.

9. The valve according to claim 1, wherein the first chamber of the pressure regulator is hydraulically connected to said inlet channel by way of a conduit external to the valve body.

10. The valve according to claim 1, wherein the second chamber of the pressure regulator is hydraulically connected to said radial channel of the ball shutter by way of an axial conduit formed in the rod of said shutter and radial conduits which are hydraulically connected to said axial conduit and, respectively, to said radial channel of the ball and to said second chamber.

* * * * *